(12) United States Patent
Bron

(10) Patent No.: US 6,937,487 B1
(45) Date of Patent: Aug. 30, 2005

(54) APPARATUS AND METHOD FOR A VOLTAGE BOOSTER WITH IMPROVED VOLTAGE REGULATOR EFFICIENCY

(75) Inventor: Ernest Armand Bron, Schijndel (NL)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/427,004

(22) Filed: Apr. 29, 2003

(51) Int. Cl.⁷ .............................................. H02M 3/18
(52) U.S. Cl. ...................................... 363/60; 323/266
(58) Field of Search ................... 363/59, 60; 327/535, 327/536; 323/266

(56) References Cited

U.S. PATENT DOCUMENTS

| | | | |
|---|---|---|---|
| 5,946,258 A * | 8/1999 | Evertt et al. ................ | 365/226 |
| 6,411,531 B1 * | 6/2002 | Nork et al. .................... | 363/60 |
| 6,518,830 B2 * | 2/2003 | Gariboldi et al. ........... | 327/536 |
| 6,538,907 B2 * | 3/2003 | Hoshino et al. .............. | 363/60 |
| 6,657,876 B2 * | 12/2003 | Satoh .......................... | 363/60 |
| 6,856,525 B2 * | 2/2005 | Wallis ......................... | 363/59 |

\* cited by examiner

*Primary Examiner*—Gary L Laxton
(74) *Attorney, Agent, or Firm*—Joshua W. Korver; Merchant & Gould

(57) ABSTRACT

A power management system includes a voltage booster in combination with a voltage regulator to provide a regulated output voltage. The voltage provided to the voltage regulator is used to selectively enable/disable the doubling functionality of the voltage booster to increase power conversion efficiency.

20 Claims, 3 Drawing Sheets

APPARATUS AND METHOD FOR A VOLTAGE BOOSTER WITH IMPROVED VOLTAGE REGULATOR EFFICIENCY

FIELD OF THE INVENTION

The present invention is generally related to power management systems. More particularly, the present invention is related to a voltage booster with improved voltage regulator efficiency.

BACKGROUND OF THE INVENTION

Voltage regulators are often used to provide a relatively constant voltage source to other electronic circuits. For example, voltage regulators are useful in battery-powered applications where the supply voltage provided by the battery can decrease over time as the battery is drained. The circuits powered by the battery often require a stable operating voltage. Depending on the voltage level required, a power management system may be required to transform the voltage provided by the battery into a stable regulated voltage as required by the circuits powered by the battery.

DETAILED DESCRIPTION OF THE PREFERRED EMBODIMENT

Figure 1:
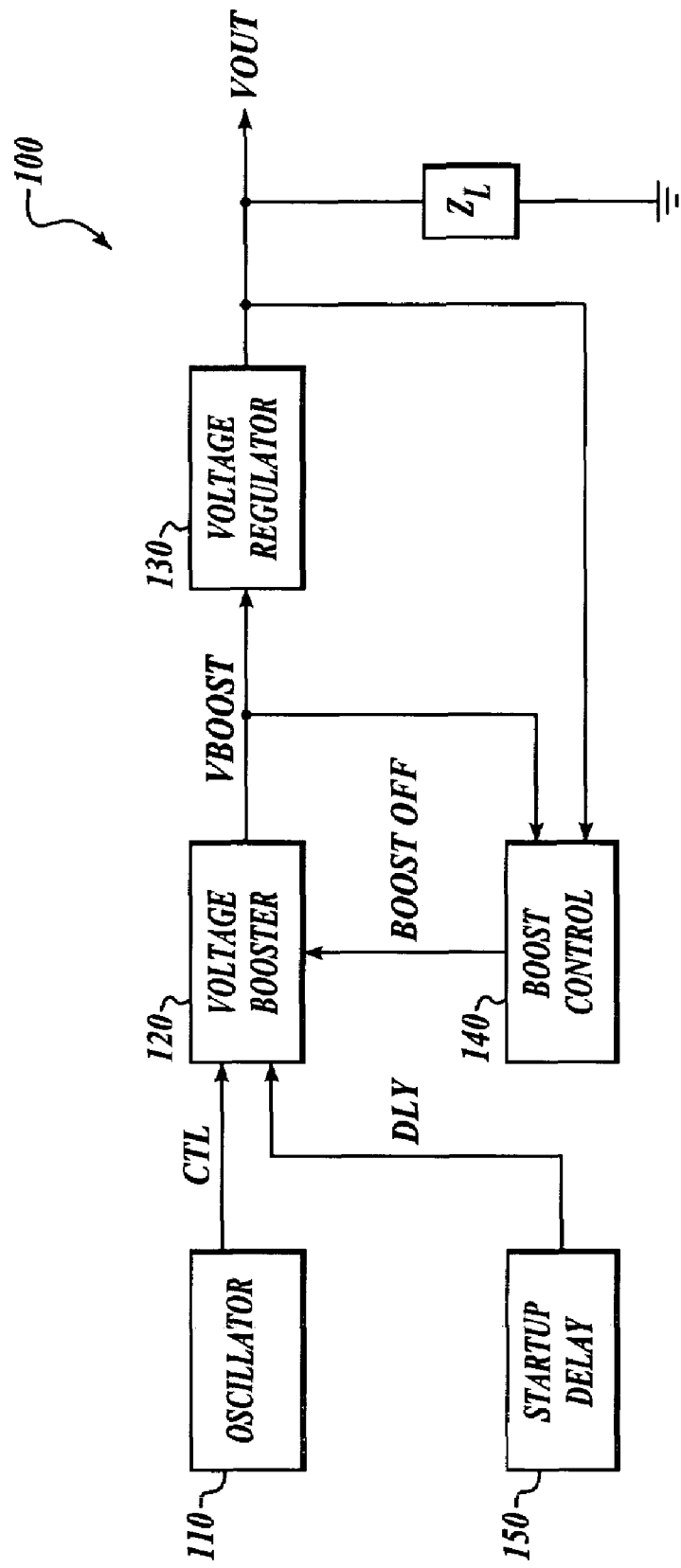
FIG. 1 is an exemplary block diagram of a circuit arranged to provide a regulated voltage from a supply voltage.

Throughout the specification, and in the claims, the term "connected" means a direct electrical connection between the things that are connected, without any intermediate devices. The term "coupled" means either a direct electrical connection between the things that are connected, or an indirect connection through one or more passive or active intermediary devices. The term "circuit" means either a single component or a multiplicity of components, either active or passive, that are coupled together to provide a desired function.

One type of circuit used in assisting to provide a regulated voltage from an unregulated voltage is a voltage booster followed by a voltage regulator. The voltage booster doubles the battery voltage and then regulates the voltage back down to the required level using the voltage regulator. Often these types of circuits internally feature a comparator which detects if the supply voltage provided by the battery is already higher than the required output voltage. When the supply voltage is higher than the required output voltage, the voltage booster is bypassed and the supply voltage is supplied directly to the voltage regulator. This power management system may waste a substantial amount of energy when the supply voltage is in the range where it is doubled to provide a sufficient voltage to the voltage regulator. The wasted energy reduces the efficiency of the system. For example, when the output voltage (Vout) required is 3.3V, the efficiency of the system may be calculated for a range of supply voltages (Vin) as follows (assuming a voltage booster efficiency of 90%):

1) Vin=4.1V
   Vout=3.3V
   System efficiency:
      Voltage booster disabled since Vin>(Vout+0.3V)
      Efficiency=3.3/4.1=80%
2) Vin=3.3V
   Vout=3.3V
   System efficiency:
      Voltage booster enabled since Vin<(Vout+0.3V)
      3.3V→6.6V (Efficiency=90%)
      6.6V→3.3V (Efficiency=3.3/6.6=50%)
      Total System Efficiency: 0.9*0.5=45%
3) Vin=2.5V
   Vout=3.3V
   System efficiency:
      Voltage booster enabled since Vin<(Vout+0.3V)
      2.5V→5.0V (Efficiency=90%)
      5.0V→3.3V (Efficiency=3.3/5.0=66%)
      Total System Efficiency: 0.9*0.66=59%

These examples show that depending on the supply voltage (Vin), power conversion efficiency can decrease dramatically.

The present invention provides an apparatus and method by which the voltage difference between the input to and the output of the voltage regulator is used to selectively enable/disable the doubling functionality of the voltage booster to increase power conversion efficiency. The present invention uses the voltage-drop over the voltage regulator to activate/deactivate the voltage doubling function of the voltage booster.

In one example, assume that the supply voltage is 3.5V declining linearly over time to 2.5V, and the selected output voltage is 3.3 V. In previous power management systems, the supply voltage is doubled across the range of available supply voltages (3.5V–2.5V) to provide a sufficient voltage to the voltage regulator. When the supply voltage is 3.5V, the voltage supplied to the voltage regulator is 7V. When the supply voltage is 2.5V, the voltage supplied to the voltage regulator is 5V. The average of these voltages is 6V, resulting in a total voltage regulator efficiency of 3.3/6=55%. Combining the voltage regulator efficiency with a voltage booster efficiency of 90% results in a system efficiency of 49.5%. In contrast, the present invention produces an average voltage supplied to the voltage regulator of 4.5V given the same range of supply voltages. With an average voltage of 4.5V, the total voltage regulator efficiency is 3.3/4.5=73%. Combining the voltage regulator efficiency with a voltage booster efficiency of 90% results in a system efficiency of 66%. Translated to battery life (given a total charge of 750 mAh), a previous power management system provides an operational time of 222 minutes for a circuit powered by the battery. In contrast, the present invention allows for an operation time of 297 minutes, an improvement of more than an hour (approximately 75 minutes) over previous power management circuits.

FIG. 1 is an exemplary block diagram of a circuit (100) arranged to provide a regulated voltage (VOUT) with improved efficiency in accordance with the present invention. The circuit (100) includes an oscillator (110), a voltage booster (120), a voltage regulator (130), a boost control (140), and a startup delay (150).

Oscillator 110 provides a control signal (CTL) to voltage booster 120. Voltage booster 120 provides a boost voltage (VBOOST) in response the control signal (CTL), a delay signal (DLY), and a boost off signal (BOOST OFF). Startup delay 150 provides the delay signal (DLY) to voltage booster 120. Boost Control 140 provides the boost off signal (BOOST OFF) to voltage booster 120 in response to the boost voltage (VBOOST) and the output voltage (VOUT). Voltage regulator 130 provides the output voltage (VOUT) in response to the boost voltage (VBOOST). The output voltage (VOUT) may be supplied by voltage regulator 130 to a circuit or a load (e.g., ZL) as a regulated voltage.

In operation, voltage booster 120 provides a boost voltage (VBOOST) that, in previous applications, ramps up to approximately double the supply voltage. The boost voltage (VBOOST) is provided by selectively coupling capacitance circuits in response to the control signal (CTL). (See FIG. 2). The doubled voltage or boost voltage (VBOOST) is regulated to a selected stable level by voltage regulator 130 to provide the output voltage (VOUT). Boost control 140 effectively compares the boost voltage (VBOOST) to the output voltage (VOUT). Boost control 140 activates the boost off signal (BOOST OFF) when the effective difference between the boost voltage (VBOOST) and the output voltage (VOUT) exceeds a first threshold (e.g., 1.2V). Voltage booster 120 deactivates the circuitry doubling the supply voltage (see FIG. 2) in response to the boost off signal (BOOST OFF). The boost voltage (VBOOST) decreases while the circuitry doubling the supply voltage is deactivated. Voltage regulator 130, however, continues to provide the output voltage (VOUT) at a selected stable voltage level.

Boost control 140 continues to effectively compare the boost voltage (VBOOST) to the output voltage (VOUT) as the boost voltage decreases. Boost control 140 deactivates the boost off signal (BOOST OFF) when the effective difference between the boost voltage (VBOOST) and the output voltage (VOUT) decreases below a second threshold (e.g., 0.3V above the output voltage). Voltage booster 120 reactivates the circuitry doubling the supply voltage in response to the deactivation of the boost off signal (BOOST OFF). The boost voltage (VBOOST) increases in response to the reactivation of the circuitry doubling the supply voltage. As previously mentioned, voltage regulator 130, continues to provide the output voltage (VOUT) at a selected stable voltage level despite changes in the voltage level of the boost voltage (VBOOST). Unnecessarily high voltage levels are avoided by maintaining the boost voltage (VBOOST) within a voltage range rather than simply doubling the voltage, maintaining the boost voltage (VBOOST) in a range improves efficiency of the circuit (100).

The delay signal (DLY) prevents voltage booster 120 from deactivating the circuitry that provides the doubling functionality during power up. The delay signal (DLY) allows the circuitry that provides the doubling functionality to be deactivated when enough time has expired to ensure that the boost voltage (VBOOST) reaches a sufficient voltage. In another embodiment, feedback from the boost voltage (VBOOST) is provided to startup delay 150. The feedback allows the boost voltage (VBOOST) to be compared to a selected threshold level. The delay signal (DLY) allows the circuitry that provides the doubling functionality to be deactivated when the boost voltage (VBOOST) reaches the selected threshold level. In a further embodiment, startup delay 150 is not included in circuit 100, and other circuitry is used to ensure that the boost voltage (VBOOST) reaches a selected threshold level before the circuitry that provides the doubling functionality is allowed to be deactivated.

Figure 2:
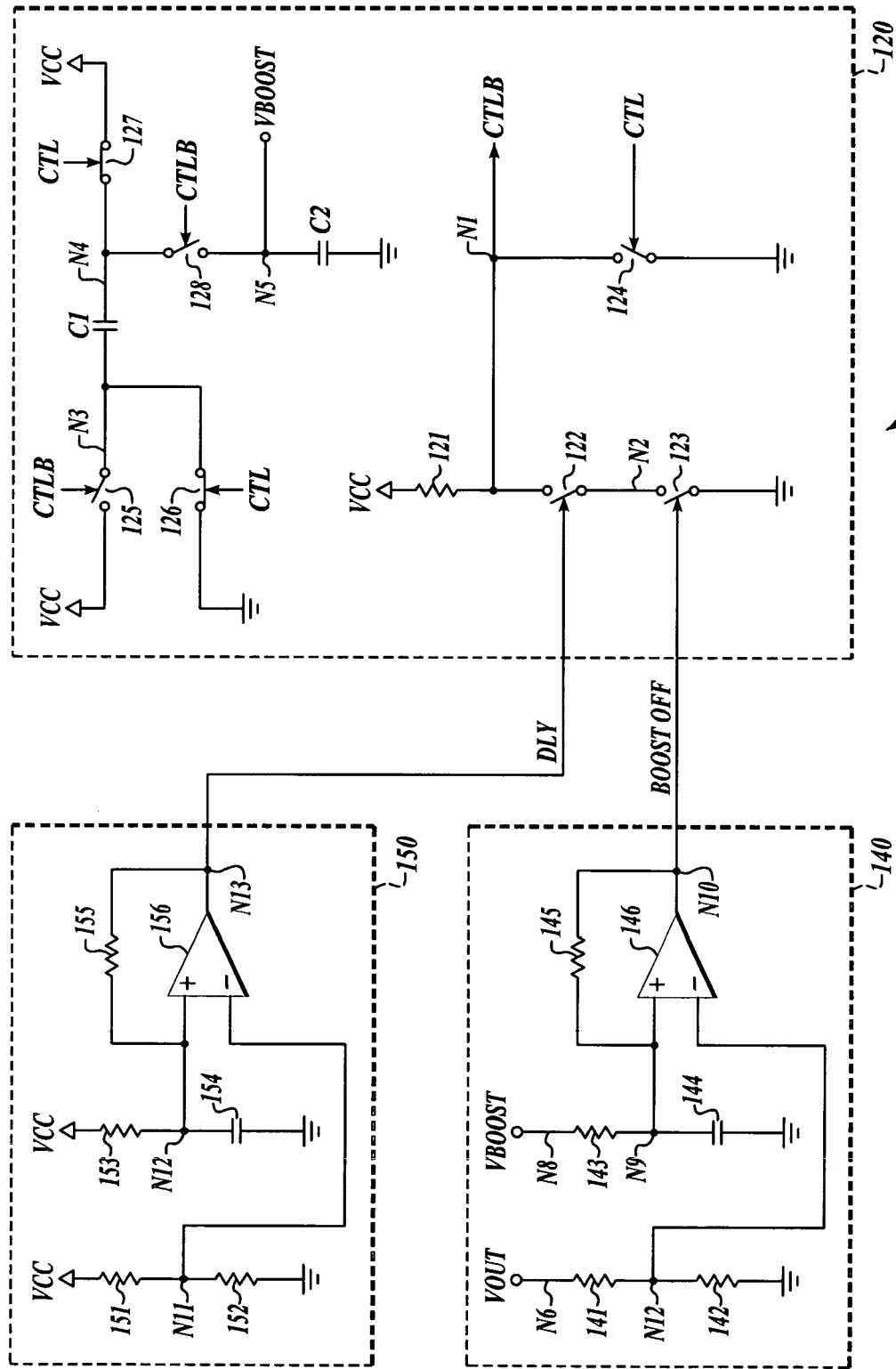
FIG. 2 is a schematic diagram of an exemplary circuit that illustrates the interconnection between the voltage booster, the boost control, and the startup delay shown in FIG. 1 in greater detail.

FIG. 2 is a schematic diagram of an exemplary circuit (200) that illustrates the interconnection between the voltage booster (120), the boost control (140), and the startup delay (150) shown in FIG. 1 in greater detail. Voltage booster 120 includes seven switch circuits (122–128), two capacitance circuits (C1 and C2), and a resistance circuit (121). Boost control 140 includes five resistance circuits (141–145), and a comparator circuit (146). Startup delay 150 includes four resistance circuits (151–153, 155), a capacitance circuit (154), and a comparator circuit (156).

Referring to voltage booster 120, resistance circuit 121 is coupled between a voltage supply (VCC) and node N1. Switch circuit 122 is coupled between node N1 and node N2. Switch circuit 123 is coupled between node N2 and ground. Switch circuit 124 is coupled between node N1 and ground. Switch circuit 125 is coupled between the voltage supply (VCC) and node N3. Switch circuit 126 is coupled between node N3 and ground. Switch circuit 127 is coupled between the voltage supply (VCC) and node N4. Switch circuit 128 is coupled between node N4 and node N5. Capacitance circuit C1 is coupled between node N3 and node N4. Capacitance circuit C2 is coupled between node N5 and ground.

Referring to boost control 140, resistance circuit 141 is coupled between node N6 and node N7. Resistance circuit 142 is coupled between node N7 and ground. Resistance circuit 143 is coupled between node N8 and node N9. Resistance circuit 144 is coupled between node N9 and ground. Resistance circuit 145 is coupled between node N9 and node N10. Comparator circuit 146 includes an inverting input that is coupled to node N7, a non-inverting input that is coupled to node N9, and an output that is coupled to node N10.

Referring to startup delay 150, resistance circuit 151 is coupled between the voltage supply (VCC) and node N11. Resistance circuit 152 is couple between node N1 and ground. Resistance circuit 153 is coupled between the voltage supply (VCC) and node N12. Resistance circuit 155 is coupled between node N12 and node N13. Capacitance circuit 154 is coupled between node N12 and ground. Comparator circuit 156 includes an inverting input that is coupled to node N11, a non-inverting input that is coupled to node N12, and an output that is coupled to node N13.

In operation, the boost control signal (CTLB) actuates switch circuits 125 and 128 that activate and deactivate the voltage doubling functionality of voltage booster 120. Three phases of activation correspond to voltage booster 120: Phase A, where the circuitry for doubling the supply voltage is deactivated; Phase B where the circuitry for doubling the supply voltage is activated; and an initial Power Up Phase.

Whether voltage booster is in Phase A or Phase B after the Power Up Phase is complete depends on the state of the boost off signal (BOOST OFF). As stated previously, the boost off signal (BOOST OFF) is produced by boost control 140. Boost control 140 receives the output voltage (VOUT) and the boost voltage (VBOOST) at nodes N6 and N8 respectively. A first voltage at node N7 corresponds to the output voltage (VOUT) and a second voltage at node N9 corresponds to the boost voltage (VBOOST). The first voltage and the second voltage are compared, effectively comparing the output voltage (VOUT) to the boost voltage (VBOOST). Voltage booster 120 enters Phase A when the boost voltage (VBOOST) increases such that the effective difference between the output voltage (VOUT) and the boost voltage (VBOOST) reaches a first threshold (e.g., 1.2V). Similarly, voltage booster 120 enters Phase B when the boost voltage (VBOOST) decreases such that the effective difference between the output voltage (VOUT) and the boost voltage (VBOOST) reaches a second threshold (e.g., 0.3V above the output voltage).

Phase A: Voltage Doubling Deactivated

Voltage booster 120 enters Phase A when the Power Up Phase is complete (described below) and the effective difference between the boost voltage (VBOOST) and the output voltage (VOUT) increases to a first threshold (e.g., 1.2V). Described differently, voltage booster 120 enters Phase A when the Power Up Phase is complete (described below) and the boost voltage (VBOOST) is above the output voltage (VOUT) by a predetermined level (e.g., 1.2V).

During Phase A, switch circuit 122 is closed in response to the delay signal (DLY) and switch circuit 123 is also closed in response to the boost off signal (BOOST OFF). The voltage corresponding to node N1 is therefore pulled towards ground. Boost control signal (CTLB) corresponds to a low logic level (logic "0") in response to the substantial ground at node N1. Switch circuits 125 and 128 are open in response to the low logic level of boost control signal (CTLB). Since switch circuits 125 and 128 are open, charge is not transferred between capacitance circuit C1 and capacitance circuit C2. The charge on capacitance circuit C2 therefore decreases over time. The voltage corresponding to node N5 also decreases in response to the decreasing charge on capacitance circuit C2, decreasing the boost voltage (VBOOST).

The control signal (CTL) produced by oscillator 110 shown in FIG. 1 actuates switch circuits 124, 126, and 127 independent of the change in phases for voltage booster 120. During Phase A, switch circuits 124, 126, and 127 are alternately closed and opened, but since no charge transfer occurs between capacitance circuit C1 and C2, the charge on capacitance circuit C1 maintains a substantially constant voltage despite the opening and closing of switch circuits 126 and 127. Also, switch circuit 124 does not affect the voltage at node N1 during Phase A, since node N1 is already substantially grounded through closed switched circuits 122 and 123.

Phase B: Voltage Doubling Activated

Voltage booster 120 enters Phase B when the Power Up Phase (described below) is complete and the difference between the boost voltage (VBOOST) and the output voltage (VOUT) is decreases below a second threshold (e.g., 0.3V above the output voltage). Described differently, voltage booster 120 enters Phase A when the Power Up Phase is complete (described below) and the boost voltage (VBOOST) is above the output voltage (VOUT) by a predetermined level (e.g., 0.3V).

During Phase B, switch circuit 122 is closed in response to the delay signal (DLY) and switch circuit 123 is open in response to the boot off signal (BOOT OFF). The voltage corresponding to node N1 is therefore pulled towards the supply voltage (VCC). In contrast to Phase A however, the voltage at node N1 may be changed depending on whether switch circuit 124 is opened or closed.

The voltage at node N1 is pulled toward the supply voltage during Phase B when switch circuit 124 is open. Boost control signal (CTLB) corresponds to a high logic level (logic "1") in response to the voltage at node N1. Switch circuits 125 and 128 are closed in response to the high logic level of boost control signal (CTLB). Switch circuits 126 and 127 are open, corresponding to switch circuit 124. Charge on capacitance circuit C1 is distributed to capacitance circuit C2 in response to the closing of switch circuits 125 and 128 and opening of switch circuits 126 and 127. The method for increasing the boost voltage (VBOOST) is related to the polarity change for capacitance circuit C1 when switch circuits 125 and 128 are closed and switch circuits 126 and 127 are opened. Capacitance circuit C1 includes a first terminal and second terminal. Prior to the charge transfer when capacitance circuit C1 is being charged, the first terminal of capacitance circuit C1 is coupled the voltage supply (VCC) and the second terminal is coupled to ground. During the charge transfer, the first terminal of capacitance circuit is coupled to a first terminal of capacitance circuit C2 and the second terminal is coupled to the voltage supply (VCC). Actuating the switch circuits (125–128) such that capacitance C1 returns to being charged results in a voltage at the first terminal of capacitance circuit C1 substantially equaling the supply voltage (VCC) minus the voltage at the first terminal of capacitance circuit C2 ($Vc2t1$) divide by two, or ($VCC-Vc2t1$)/2. Accordingly, as the switch circuits (125–128) are actuated to alternate between charging capacitance circuit C1 and distributing charge between capacitance circuit C1 and capacitance circuit C2, the boost voltage (VBOOST) is increased.

The voltage at node N1 is pulled toward ground during Phase B when switch circuit 124 is closed. Voltage booster 120 therefore operates similar to when voltage booster 120 is in Phase A and switch circuits 124, 126, and 127 are closed. Charge distribution is interrupted between capacitance circuit C1 and capacitance circuit C2, and capacitance circuit C1 is charged since switch circuits 124, 126, and 127 are closed and switch circuits 125 and 128 are open. Capacitance circuit C1 is therefore alternately charged and then coupled to distribute charge to capacitance circuit C2 during Phase B according to the frequency of oscillator 110.

Power Up Phase

At power up, switch circuit 122 is open in response to the delay signal (DLY). The voltage corresponding to node N1 is therefore pulled towards the supply voltage (VCC) despite the state of the boot off signal (BOOT OFF). Accordingly, voltage booster 120 operates similarly in the Power Up Phase as in Phase B such that the boost voltage (VBOOST) is increased over time.

The delay signal (DLY) is produced according to an RC time constant provided by startup delay 150. Comparator 156 compares a first voltage corresponding to node N11 to a second voltage corresponding to node N12. The voltage corresponding to node N11 increases quickly when power is first supplied to startup delay 150 at the voltage supply (VCC). The voltage corresponding to node N12, however increases more slowly as capacitance circuit 154 is charged. The delay in charging capacitance circuit 154, delays the change in state for the delay signal (DLY). The Power Up Phase is complete once the delay signal (DLY) changes state, switch circuit 122 closes, and the doubling functionality of voltage booster 120 is allowed to be deactivated.

Figure 3:
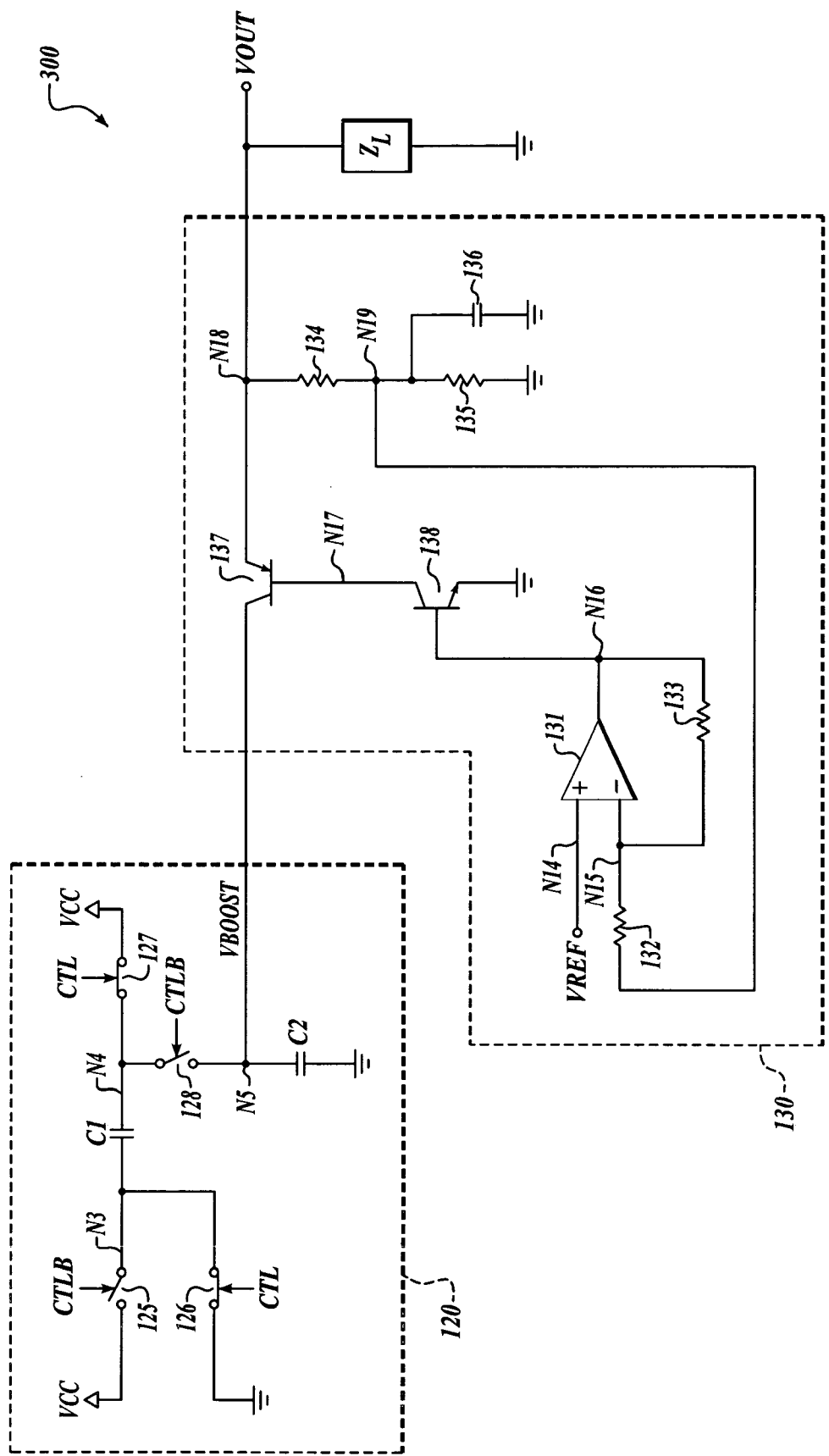
FIG. 3 is a schematic diagram of an exemplary circuit that illustrates the interconnection of the voltage booster and the voltage regulator shown in FIG. 1 in greater detail, in accordance with the present invention.

In other embodiments, other architectures may be used for startup delay 150 and boost control 140 without departing from the spirit and scope of the invention FIG. 3 is a schematic diagram of an exemplary circuit (300) that illustrates the interconnection of the voltage booster (120) and the voltage regulator (150) shown in FIG. 1 in greater detail. The portion of voltage booster 120 illustrated, includes the three switch circuits (125–128) and two capacitance circuits (C1 and C2) as shown in FIG. 2. Voltage regulator 130 includes a comparator circuit (131), four resistance circuits (132–135), a capacitance circuit 136, and two transistors (137 and 138).

The elements of the portion of the voltage booster 120 illustrated are coupled according to a similar architecture as the corresponding elements shown in FIG. 2.

Referring to voltage regulator 130, comparator circuit 131 includes an non-inverting input that is coupled to node N14, an inverting input that is coupled to node N15, and an output that is coupled to node N16. Resistance circuit 132 is coupled between node N15 and node N19. Resistance circuit 133 is coupled between node N15 and N16. Resistance circuit 134 is coupled between node N18 and N19. Resistance circuit 135 is coupled between node N19 and ground. Capacitance circuit 136 is coupled between node N19 and ground. Transistor 137 includes a base that is coupled to node N17, a collector that is coupled to node N5 of voltage booster 120, and an emitter that is coupled to node N18. Transistor 138 includes a base that is coupled to node N16, a collector that is coupled to node N17, and an emitter that is coupled to ground.

In operation, the boost voltage (VBOOST) corresponding to node N5 increases and decreases according to the operation of voltage booster 120 as described in the discussion of FIG. 2. The boost voltage (VBOOST) increases and decreases across a range of voltages higher than the output voltage (VOUT) and less than double the supply voltage. Current flows across transistor 137 as the boost voltage (VBOOST) increases after power up. The voltage at node N18 increases in response to the current across transistor 137. The voltage at node N19 increases as the voltage at node N18 increases at rate determined by capacitance circuit 136. The voltage at node N19 corresponds to the voltage at node N15. Comparator circuit 131 compares the voltage at node N15 with the reference voltage (VREF) at node N14. The output of comparator circuit 131 activates transistor 138 when the voltage at node N15 is greater than the reference voltage (VREF). Current is pulled from node N17 to ground across transistor 138 when transistor 138 is activated, deactivating transistor 137. The voltage at node N18, corresponding to the output voltage (VOUT), is substantially maintained by capacitance circuit 136. The output voltage (VOUT) decreases as charge is dissipated from capacitance circuit 136, decreasing the corresponding voltage at node N15. Transistor 138 is deactivated in response to the output of comparator circuit 131 when the voltage at node N15 decreases below the reference voltage (VREF). Transistor 137 is reactivated when transistor 138 is deactivated. The output voltage (VOUT) begins increasing again in response to the reactivation of transistor 138. The output voltage (VOUT) is therefore regulated to a selected level by selecting the reference voltage (VREF) provided to comparator circuit 131.

It is appreciated from the discussion above that a voltage regulator other than voltage regulator 130 shown in FIG. 3 may be used in combination with the present invention without departing from the spirit and scope of the invention. In other embodiments, the ground terminal shown in FIGS. 2 and 3 may be replaced with another voltage supply (e.g., VEE) that provides a different voltage than supplied by the voltage supply VCC.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for providing a regulated output voltage, comprising:

a voltage regulator that is arranged to provide the regulated output voltage in response to a boost voltage;

a voltage booster that is arranged to selectively distribute charge from a first capacitance circuit to a second capacitance circuit when activated and prevent the distribution of charge from the first capacitance circuit to the second capacitance circuit when deactivated, wherein the boost voltage is associated with the second capacitance circuit such that the boost voltage increases when the voltage booster is activated and decreases when the voltage booster is deactivated;

a boost control that is arranged to selectively control the voltage booster in response to a comparison of the boost voltage and the regulated output voltage such that the voltage booster is deactivated when the boost voltage is above the regulated output voltage by a predetermined level; and an oscillator that is arranged to provide a control signal to the voltage booster, wherein operation of the oscillator is unaffected by operation of the boost control, the voltage booster, and the voltage regulator.

2. The apparatus of claim 1, further comprising a startup delay that is arranged to prevent the boost control circuit from deactivating the voltage booster during power up.

3. The apparatus of claim 1, wherein the voltage booster is further arranged such that the first capacitance circuit is selectively coupled to the second capacitance circuit in response to the control signal when the voltage booster is activated.

4. The apparatus of claim 1, wherein the voltage booster is deactivated during a first phase and activated during a second phase, wherein the first phase and the second phase are different from one another.

5. The apparatus of claim 4, wherein the first phase is entered when the boost voltage is above the regulated output voltage by a predetermined level, and the second phase is entered when the boost voltage is above the regulated output voltage by another predetermined level.

6. The apparatus of claim 1, wherein the voltage booster is arranged such that: the first capacitance circuit is selectively coupled between a first voltage supply and a second voltage supply during a first interval when the voltage booster is activated, and the first capacitance circuit is selectively coupled between the first voltage supply and the second capacitance circuit during a second interval when the voltage booster is activated.

7. The apparatus of claim 6, wherein the first capacitance circuit includes a first terminal and second terminal, such that: the first terminal is coupled to the first voltage supply and the second terminal is coupled to the second voltage supply during the first interval, and the first terminal is coupled to the second capacitance circuit and the second terminal is coupled to the first voltage supply during the second interval.

8. The apparatus of claim 6, wherein the second voltage supply corresponds to ground.

9. The apparatus of claim 1, wherein the voltage booster is arranged such that: the first capacitance circuit is selectively coupled between a first voltage supply and a second voltage supply during the first interval when the voltage booster is deactivated, and the first capacitance circuit remains selectively coupled between the first voltage supply and the second voltage supply during the second interval when the voltage booster is activated.

10. A method for providing a regulated output voltage, comprising:

charging a first capacitance circuit in a voltage booster to provide a charge during a first interval when the voltage booster is active;

transferring the charge from the first capacitance circuit to a second capacitance circuit in the voltage booster to provide a boost voltage during a second interval when the voltage booster is active;

determining a difference between the boost voltage and the regulated output voltage;

deactivating the voltage booster during a first phase when the difference between the boost voltage and the regulated output voltage is above a first threshold, wherein the boost voltage decreases and the distribution of charge from the first capacitance circuit to the second capacitance circuit is prevented when the voltage booster is deactivated;

activating the voltage booster during a second phase when the difference between the boost voltage and the regulated output voltage is below a second threshold, wherein the boost voltage increases when the voltage booster is activated;

regulating the boost voltage to provide the regulated output voltage; and producing a control signal that controls transferring the charge from the first capacitance circuit to the second capacitance circuit, wherein production of the control signal is unaffected by determination of the difference between the boost voltage and regulated output voltage, deactivation of the voltage booster, activation of the voltage booster, aid regulation of the boost voltage.

11. The method of claim 10, further comprising selectively coupling the first capacitance circuit between a first voltage supply and a second voltage supply during the first interval when the voltage booster is activated, and selectively coupling the first capacitance circuit between the first voltage supply and the second capacitance circuit during the second interval when the voltage booster is activated.

12. The method of claim 11, further comprising selectively coupling a first terminal associated with the first capacitance circuit to the first voltage supply and selectively coupling a second terminal associated with the first capacitance circuit to the second voltage supply during the first interval.

13. The method of claim 11, further comprising selectively coupling a first terminal associated with the first capacitance circuit to the second capacitance circuit and selectively coupling a second terminal associated with the first capacitance circuit to the first voltage supply during the second interval.

14. The method of claim 10, further comprising selectively coupling the first capacitance circuit between a first voltage supply and a second voltage supply during both the first interval and the second interval when the voltage booster is deactivated.

15. The method of claim 10, wherein the first capacitance circuit is selectively coupled to the second capacitance circuit in response to the control signal when the voltage booster is activated.

16. The method of claim 10, further comprising producing a delay signal, wherein delay signal prevents the voltage booster from deactivating during power up.

17. An apparatus for providing a regulated output voltage, comprising:

means for charging a first capacitance circuit in a voltage booster to provide a charge during a first interval when the voltage booster is active;

means for transferring the charge from the first capacitance circuit to a second capacitance circuit in the voltage booster to provide a boost voltage during a second interval when the voltage booster is active;

means for determining a difference between the boost voltage and the regulated output voltage;

means for deactivating the voltage booster during a first phase when the difference between the boost voltage and the regulated output voltage is above a first threshold, wherein the boost voltage decreases and the distribution of charge from the first capacitance circuit to the second capacitance circuit is prevented when the voltage booster is deactivated;

means for activating the voltage booster during a second phase when the difference between the boost voltage and the regulated output voltage is below a second threshold, wherein the boost voltage increases when the voltage booster is activated;

means for regulating the boost voltage to provide the regulated output voltage; and means for producing a control signal that controls transferring the charge from the first capacitance circuit to the second capacitance circuit, wherein the means for producing the control signal is unaffected by the means for determination of the difference between the boost voltage and regulated output voltage, the means for deactivating of the voltage booster, the means for activating of the voltage booster, and the means for regulating of the boost voltage.

18. The apparatus of claim 17, further comprising means for selectively coupling the first capacitance circuit between a first voltage supply and a second voltage supply during the first interval when the voltage booster is activated, and means for selectively coupling the first capacitance circuit between the first voltage supply and the second capacitance circuit during the second interval when the voltage booster is activated.

19. The apparatus of claim 17, further comprising means for selectively coupling the first capacitance circuit between a first voltage supply and a second voltage supply during the first phase, wherein charge corresponding to the first capacitance circuit is maintained at a selected level.

20. The apparatus of claim 17, wherein the first capacitance circuit is selectively coupled to the second capacitance circuit in response to the control signal when the voltage booster is activated.

* * * * *

UNITED STATES PATENT AND TRADEMARK OFFICE
CERTIFICATE OF CORRECTION

PATENT NO. : 6,937,487 B1
DATED : August 30, 2005
INVENTOR(S) : Ernest Armand Bron It is certified that error appears in the above-identified patent and that said Letters Patent is hereby corrected as shown below:

Column 4,
Line 35, "N1" should read -- N11 --.

Column 9,
Line 30, "aid" should read -- and --.

Signed and Sealed this

Thirty-first Day of January, 2006

JON W. DUDAS
*Director of the United States Patent and Trademark Office*